April 3, 1962        UNOKICHI TAKAI ET AL        3,027,595
   APPARATUS AND METHOD OF CONTINUOUS MOLDING OF A THERMOPLASTIC
              SHEET HAVING FINE PILE-LIKE PROJECTIONS
Filed April 18, 1960                              2 Sheets-Sheet 1
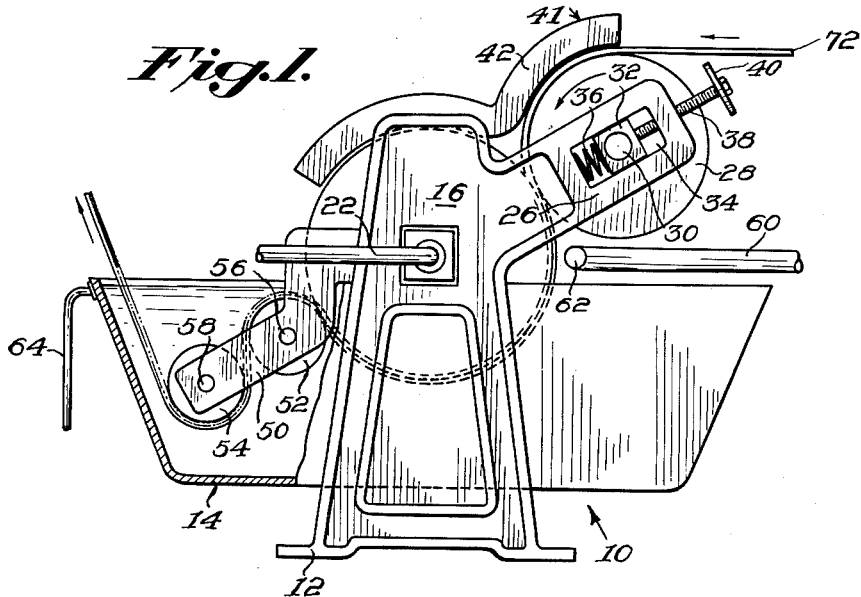
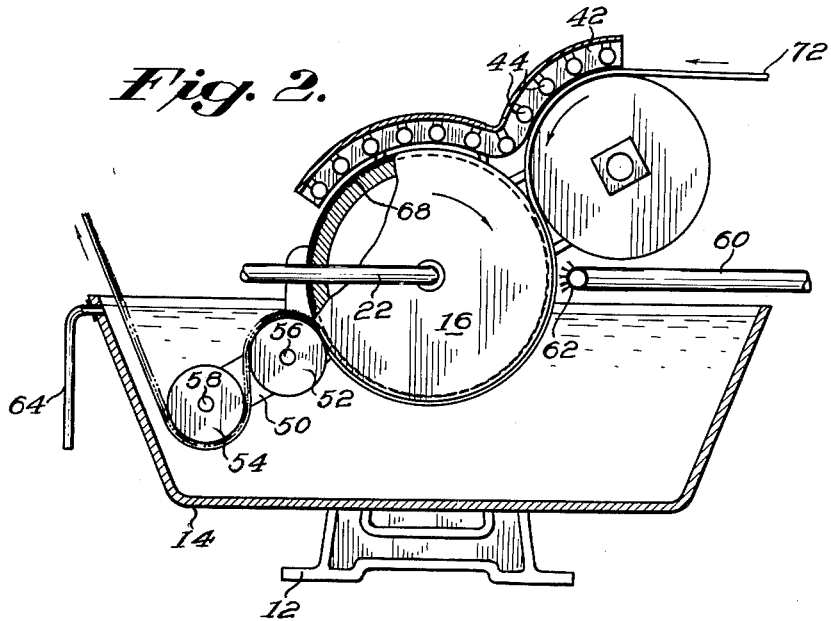
INVENTORS
Unokichi Takai
BY Tsunekatsu Ishiyama
AGENT.

April 3, 1962 UNOKICHI TAKAI ET AL 3,027,595
APPARATUS AND METHOD OF CONTINUOUS MOLDING OF A THERMOPLASTIC
SHEET HAVING FINE PILE-LIKE PROJECTIONS
Filed April 18, 1960 2 Sheets-Sheet 2
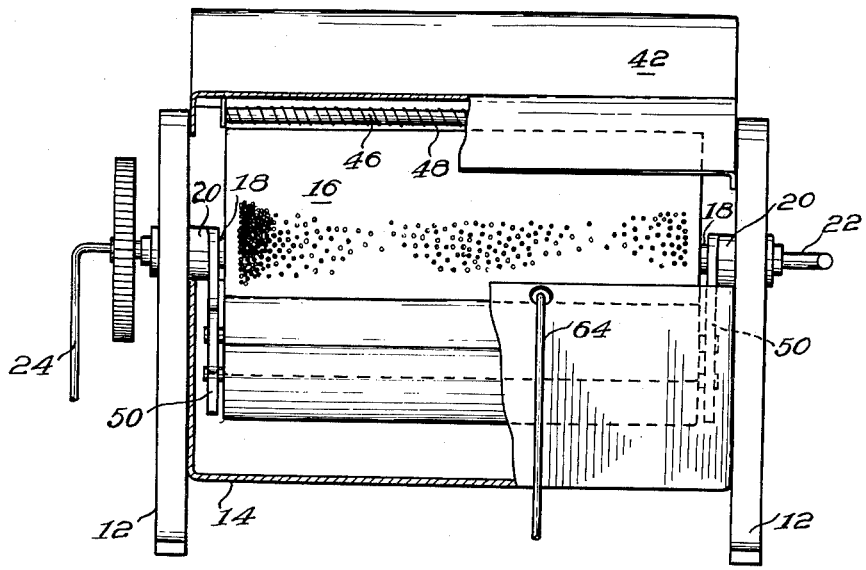
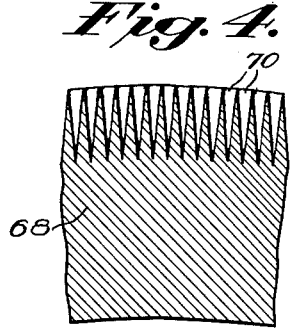
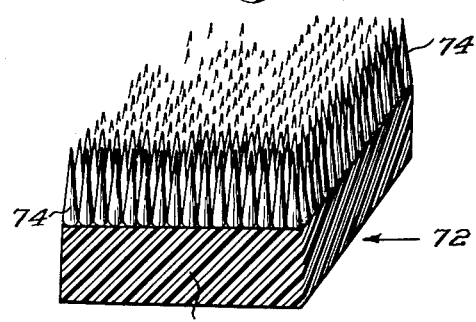
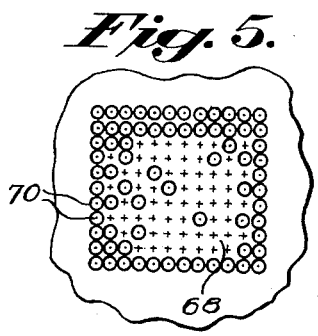
INVENTORS
Unokichi Takai
BY Tsunekatsu Ishiyama.
Chandler Pidgeon
AGENT 3,027,595
APPARATUS AND METHOD OF CONTINUOUS MOLDING OF A THERMOPLASTIC SHEET HAVING FINE PILE-LIKE PROJECTIONS
Unokichi Takai, 14 Kasuga-cho, and Tsunekatsu Ishiyama, 93 Motoyanagi-cho, both of Kofu City, Yamanashi-ken, Japan
Filed Apr. 18, 1960, Ser. No. 22,782
7 Claims. (Cl. 18—10)

This invention relates to an apparatus and method of continuous molding of a thermoplastic sheet having fine pile-like projections. More particularly this invention relates to a device for the production of a thermoplastic sheet having integral pile-like projections to form an artificial velvet fabric.

An object of this invention is the production of a thermoplasic sheet having at least one pile-like surface.

Another object of this invention is the provision of a means and method of producing a sheet of thermoplastic material having closely spaced integral conical projections on one face thereof.

An additional object of this invention is the provision of a means for continuously pressing a softened thermoplastic sheet on a mold to produce a multitude of piliform projections on one face thereof.

These and other objects will become apparent upon consideration of the following specification taken with the accompanying drawings forming a part thereof.

In the drawings:

FIG. 1 is a side elevation of our machine with parts in section;

FIG. 2 is a similar elevation with additional parts in section;

FIG. 3 is a front elevation with parts removed;

FIG. 4 is a fragmentary section of the molding roll;

FIG. 5 is a fragmentary plan view of the portion shown in FIG. 4; and

FIG. 6 is a fragmentary axonometric view of a sheet produced by this machine.

Referring now to the drawings, wherein like parts are represented by like characters of reference throughout the several views, in FIGS. 1, 2 and 3, the numeral 10 refers to the machine described herein. The machine 10 includes a supporting frame 12 on which a vat 14, is mounted, for the reception of cooling fluid, as explained hereinafter.

On the frame 12 a molding drum 16, having a shaft 18, is mounted in bearings 20 in the frame members 12. The shaft 18 is tubular and is connected with inlet pipe 22 and outlet pipe 24. The drum 16 is positioned so that it is partially submerged in the fluid in the vat 14.

Adjacent the molding drum 16 on brackets 26 on the frame 12 there is a pressing and heating roll 28. The roll 28 has a shaft 30 mounted in bearing blocks 32 slidably mounted in elongated rectangular openings 34 in the brackets 26, and urged outwardly by springs 36. The roll 28 is adjusted toward the drum by means of a screw 38 engaging the block 32 and having a handwheel 40.

A heating element 41 is mounted adjacent the outer periphery of the drum 16 and the roll 28. The heating element comprises a hood 42 having therein a plurality of heating elements 44. While these heating elements 44 may be of any conventional type such as Calrod or infra red lamps, we show them to be ceramic rods 46 having heating coils 48 of suitable resistance wire. The wires 48 are connected to a suitable source of electric potential, not shown.

Attached to the frame 12 and extending below the drum 16 there is a pair of brackets 50 on which are mounted rolls 52 and 54 having shafts 56 and 58, respectively. The rolls 52 and 54 are submerged in the fluid in the vat 14.

A pipe 60, at the right in FIGS. 1 and 2, is provided with a spray head 62 adjacent the drum 16. An outflow pipe 64 connected adjacent the upper edge of the vat 14 maintains the desired level of fluid 66 in the vat 14.

The drum 16 is hollow and has a shell 68 which may be from 10 mm. to 20 mm. in thickness. The shell 68 is provided on its outer surface with a multiplicity of closely spaced depressions 70, which, as shown, are conical, but may be pyramidal or other desired shape. The depressions or cavities 70 are preferably from about 10 to 20 times as deep as their maximum diameter. The ratio of diameter to length is determined by the softness and pile-like appearance desired in the fabric. The shorter and finer piliform projections on the fabric make it velvet like, while longer and stiffer projections make a carpet-like fabric.

A sheet 72 of thermoplastic material as later described is led over the pressing roll 28 adjacent the heater 41, which softens the sheet. Steam at a tempearture of about 170° C. is admitted into the drum 16 through the pipe 22 to heat the drum 16. The outer surface of the drum 16 is heated by means of the heaters 44. The sheet 72 passes between the drum 16 and the pressure roll 28 and having been softened some by the heater 41 is further softened on one face by contact with the heated surface 68 of the drum 16. A portion of the sheet 72 is pressed into the depressions or mold cavities 70 in the drum 16 to produce the piliform projections 74 on the sheet 72. The remainder of the thickness of the sheet forms the backing 76. The sheet 72 then passes under the drum 16 where it is first sprayed with water at a temperature of about 4° C. by the spray head 62, and then it passes into the water 66 in the vat 14. The sheet 72 then passes from the molding drum 16 to the stripping roll 52 and thence to the roll 54, whence it travels to a suitable collecting means, not shown. In its passage about the drum 16, through the water 66, the fabric 72 is cooled and set. The back 76 sets first, and the piliform projections 74 are formed and set soon thereafter. The outer surface of the drum 16 is temporarily cooled somewhat below the softening point of the plastic, but soon heats up again due to the high temperature steam within the drum 16. However, at the time that the sheet 72 is pressed against the drum 16, the skin or outer surface is heated to a temperature slightly above the softening temperature of the sheet 72. The back part 76 of the sheet 72 is cooled quickly by the spray from the head 62. The piliform projections are more slowly cooled and set.

The temperature of the surface of the drum 16 is approximately 170° to 190° C. when working with vinyl chloride plastic. The inner surface of the shell 68 will be about 150° C. Where the drum 16 and the sheet 72 are in contact with the water 66, the temperature of the shell will be about 100° C.

A suitable material for use in our method has substantially the following composition:

| | Kg. |
|---|---|
| Vinyl resin | 100 |
| Octyl phthalate | 40 |
| Butyl phthalate | 10 |
| Octyl adipate | 15 |
| Lead stearate | 15 |
| Stannic laurate | 0.7 |
| Pigment, q.s. | |

A sheet of the above material about 1 m. wide and 2 mm. thick is passed through the machine at about 3 cm. per minute, with a pressure exerted by the roll 26 of 130 kg. per cm.$^2$. The pressure of the water at 4° C. at the jet 62 is about 4 kg. per cm.$^2$ and the temperature of the bath 66 is about 10° C. A fabric is produced, in this example, as a carpet, having piliform projections 74 about 3 mm. long and about 0.15 mm. in base diameter. As the surface of the drum 16 leaves the bath 66, the temperature is about 110° C., and after heating by the heaters it reaches a temperature of about 180° C. where it contacts the sheet 72. The inside temperature at the low point is about 80° C., while the inside temperature at the upper side is about 150° C.

In the case of relatively deep molding cavities, the surface of the molding roll 16 at the point of contact with the thermoplastic sheet 72 is at preferably a temperature slightly higher than the melting point of the thermoplastic sheet 72, and the surface adjacent the roll 16 melts and flows into the depressions 70. At their inner ends the depressions may be just at the melting point of the thermoplastic or even at a little lower temperature than the melting point of the thermoplastic. The thermoplastic material thus flows easily into the depression 70. Contact of the spray from the spray head 62 cools the sheet 72 and the piliform projections 74 begin to set at their roots. Contact of the sheet 72 and the molding roll 16 with the water 66 causes the piliform members to set. This produces long fine piliform members 74 to make a soft resilient surface on the sheet 72. The new fabric can be formed rapidly and continuously by the operation of the machine above described.

It is to be understood that although we have described a preferred form of our invention, modifications and alterations may be made within the skill of the art and the scope of the appended claims.

We claim:

1. Apparatus for producing a sheet of thermoplastic material having piliform projections on one surface thereof comprising a frame, a tank for cooling fluid on said frame, a rotatable molding drum on said frame and having a multiplicity of fine inwardly tapered depressions in the outer surface thereof, means for feeding a sheet of thermoplastic material into engagement with said drum, means for applying heat to said material and said drum, adjacent the point of contact of said sheet with said drum, to soften said thermoplastic material as it contacts said drum, means to press said sheet onto said drum, means extending over said tank for spraying said sheet while on said drum with cooling fluid to set said thermoplastic material, and whereby the fluid accumulates in the tank and partly submerges the drum.

2. The method of continuously producing a sheet of thermoplastic material having a pile like surface which comprises continuously feeding said sheet onto a continuously moving die having fine shallow tapered depressions therein and wherein the depth of the depressions is from 10 to 20 times the greatest diameter thereof, heating the sheet and the die to soften the sheet, molding the sheet by pressing same onto said die, spraying cooling fluid on the surface of said molded sheet remote from said die and withdrawing said sheet from said die.

3. The device according to claim 1, wherein the drum is partly submerged in the tank of fluid.

4. The structure as defined in claim 1, wherein the heating means includes a conduit leading thereinto for supplying steam to the interior of the drum and radiant heaters adjacent the surface of the drum.

5. The structure as defined in claim 4, wherein the feeding means comprises a roller adjacent the drum and adjustable bearings for mounting said roller to regulate the pressure applied to the sheet of thermoplastic material.

6. The structure as defined in claim 3, wherein the upper portion of the drum is maintained at a much higher temperature than the submerged portion, and wherein the sheet of thermoplastic contacts the drum prior to submergence.

7. The structure according to claim 6, wherein the withdrawal of the material from the drum occurs in the tank of fluid.

References Cited in the file of this patent

UNITED STATES PATENTS

| | | |
|---|---|---|
| 2,055,410 | Hurst et al. | Sept. 22, 1936 |
| 2,218,227 | Winnek | Oct. 15, 1940 |
| 2,514,213 | Mason et al. | July 4, 1950 |
| 2,526,318 | Battin | Oct. 7, 1950 |
| 2,582,165 | Rosenfeld | Jan. 8, 1952 |
| 2,728,944 | Crooks | Jan. 3, 1956 |
| 2,859,669 | Leitzel | Nov. 11, 1958 |
| 2,922,732 | Hopkins et al. | Jan. 26, 1960 |